(12) United States Patent
Floyd

(10) Patent No.: US 8,966,777 B2
(45) Date of Patent: Mar. 3, 2015

(54) LEVELS AND LEVELING SYSTEMS

(76) Inventor: Rex Harvey Floyd, Franklinton, NC (US)

(*) Notice: Subject to any disclaimer, the term of this patent is extended or adjusted under 35 U.S.C. 154(b) by 171 days.

(21) Appl. No.: 13/481,316

(22) Filed: May 25, 2012

(65) Prior Publication Data

US 2012/0297636 A1 Nov. 29, 2012

Related U.S. Application Data

(60) Provisional application No. 61/489,804, filed on May 25, 2011.

(51) Int. Cl.
*G01B 11/14* (2006.01)
*A01D 34/74* (2006.01)
*G01B 11/00* (2006.01)

(52) U.S. Cl.
CPC ............... *G01B 11/14* (2013.01); *A01D 34/74* (2013.01); *G01B 11/00* (2013.01)
USPC ............................................. 33/286; 33/628

(58) Field of Classification Search
CPC . A01D 34/54; A01D 34/006; B23Q 17/2225; B23Q 17/2216; B23Q 17/22; B23Q 17/2414; B23Q 17/2419; G01B 5/14; G01B 11/14
USPC .................... 33/286, 288, 628, 629, 631, 633
See application file for complete search history.

(56) References Cited

U.S. PATENT DOCUMENTS

| 5,020,228 | A | * | 6/1991 | Hessenthaler | 33/628 |
| 5,031,335 | A | * | 7/1991 | Kimmelman | 33/628 |
| 5,033,201 | A | * | 7/1991 | Hinkle et al. | 33/641 |
| 5,175,939 | A | * | 1/1993 | Wolfram | 33/628 |
| 6,073,357 | A | * | 6/2000 | Kosmalski | 33/628 |
| 7,114,318 | B2 | * | 10/2006 | Poulson et al. | 56/249 |
| 7,194,812 | B2 | * | 3/2007 | Davis | 33/286 |
| 7,392,645 | B1 | * | 7/2008 | Elmore | 56/249 |
| 7,624,560 | B1 | * | 12/2009 | Humphrey | 56/17.2 |
| 8,209,874 | B1 | * | 7/2012 | Tribble et al. | 33/286 |
| 2003/0140611 | A1 | * | 7/2003 | Burke | 56/17.2 |
| 2005/0235504 | A1 | * | 10/2005 | Barvosa-Carter et al. | 33/286 |
| 2013/0258338 | A1 | * | 10/2013 | Fujimori et al. | 356/400 |

* cited by examiner

*Primary Examiner* — Christopher Fulton
(74) *Attorney, Agent, or Firm* — Kilpatrick Townsend & Stockton LLP

(57) ABSTRACT

Embodiments of the present invention include levels, level assemblies and/or apparatus for leveling. Certain embodiments of the present invention are advantageous for the adjustment and leveling of cutting instruments, such as the blades of a mower.

6 Claims, 3 Drawing Sheets

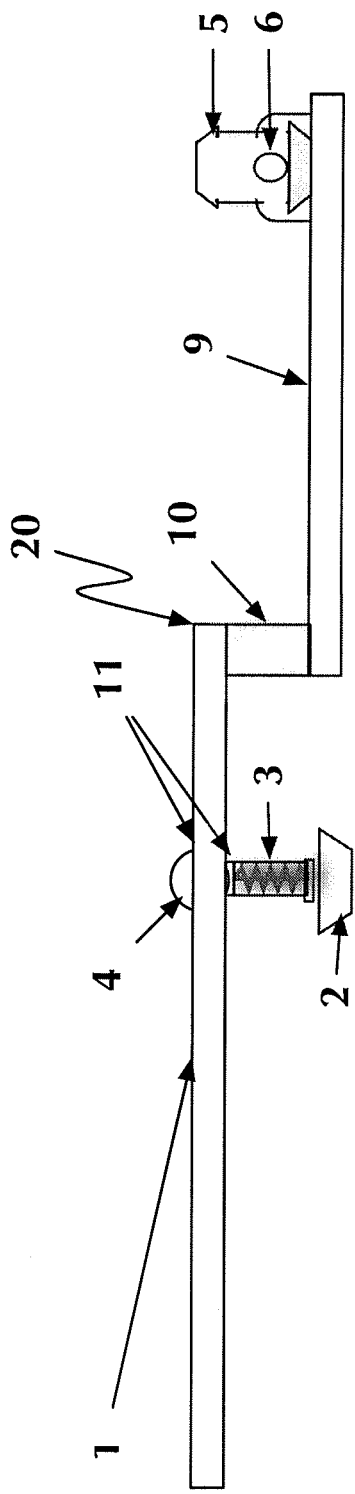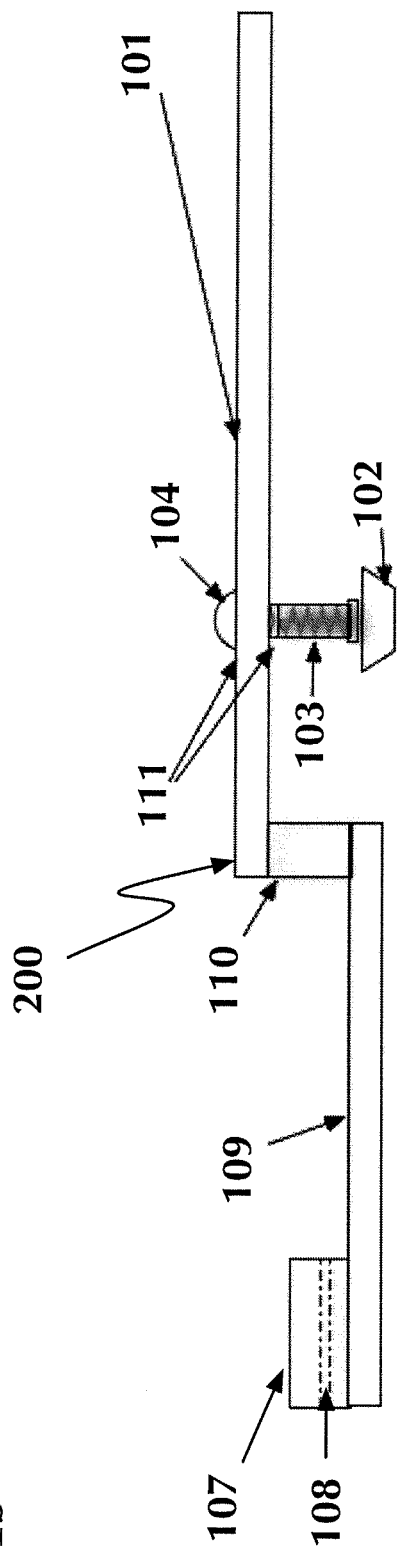
FIG. 1a
FIG. 1b

LEVELS AND LEVELING SYSTEMS

RELATED APPLICATIONS

The present invention claims priority under 35 USC 119(e) to U.S. Provisional Patent Application No. 61/489,804, filed May 25, 2011. The disclosure of U.S. Provisional Patent Application No. 61/489,804, is incorporated by reference in its entirety herein.

FIELD OF THE INVENTION

The invention relates generally to levels, leveling systems, and leveling instruments. Embodiments of the present invention may be advantageous for adjustment and leveling of cutting implements such as those found on turf and/or earth cutting equipment. An embodiment of the invention provides end-user feedback during the adjustment and leveling of cutting implements.

BACKGROUND

Turf, earth and landscape operations often involve cutting operations, for example to reduce turf height, or for grading earth. Adjustments to the instruments used for cutting, such as unit reels, or blades, are often necessary to maintain turf at a desired uniform height, or to uniformly grade earth. Significant and costly damage to equipment, vegetation, turf and/or earth can result from poorly adjusted cutting instruments.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In an embodiment the present invention provides a level, that also may be referred to herein as a level assembly and/or an apparatus for leveling. The terminology "level" when used as a noun herein, in used in a manner consistent with its ordinary meaning to refer to an instrument for leveling. The terminology "level", when used as adjective herein, is used in a manner consistent with its ordinary meaning to describe a plurality of real, or virtual, surfaces that are on substantially the same real or virtual plane. The plane may be in any direction, based on the intended use of the surface.

The terminology "level" or "leveling", when used as a verb herein, is used in a manner consistent with its ordinary meaning to refer to the process of making a real or virtual surface, or plurality of real or virtual surfaces, level. In an embodiment, a level of the present invention may be advantageously utilized in the process of leveling a surface. In a further embodiment, the present invention provides a process for leveling a surface.

In an embodiment, the level, level assembly, or leveling apparatus, may be used directly. The level may also be advantageously adapted for use with equipment, and/or machines, and/or components thereof; and/or adapted for the adjustment and/or maintenance of equipment or machine components. The present invention also provides equipment, machines and component parts thereof comprising a level of the present invention.

In an embodiment, a level, level assembly, or leveling apparatus, of the present invention is adapted for use to level cutting instruments on a cutting unit, such as, by way of example, a cutting unit found on a piece turf equipment utilized to cut turf or a cutting blade on earth moving/grading equipment utilized to cut earth. In an embodiment, the cutting instrument comprises a blade, or plurality of blades. The cutting unit may comprise a reel that comprises a cutting instrument. The cutting unit further comprises means for adjusting the cutting instrument, or plurality of cutting instruments. In an embodiment, a cutting component may comprise bladed reel. In another embodiment, a cutting component may comprise a plurality of blades or bedknives.

An embodiment of a level of the present invention may be advantageously used to level a cutting component of a cutting unit. Such leveling of a cutting component may be important to create a uniform turf height, a uniform earth grade, and/or to prevent or minimize damage to turf, earth or landscape caused by a cutting unit that is not level.

In a further embodiment, the present invention provides a leveling assembly in combination with a cutting instrument. In an additional embodiment, the present invention provides an apparatus for cutting turf comprising a level of the present invention. In another embodiment, the present invention provides an apparatus for cutting earth comprising a level of the present invention.

Still further embodiments of the present invention include turf equipment (e.g. mowers and the like) and/or earth equipment (e.g. graders and the like) comprising a level of the present invention.

In an embodiment, the present invention provides a level comprising: a transmitter; a first support member in communication with the transmitter; a receiver; and a second support member in communication with the receiver. In an embodiment, a level may further comprise means for attaching the first and/or second support members to a structure, for example a structure to be leveled.

In an embodiment, for use, the first and second support members are positioned such that a signal generated by the transmitter is received by the receiver thereby indicating that a desired adjustment has occurred, preferably in a manner discernible to the user. In an embodiment for use with a cutting instrument, the first and second support members are positioned proximate to the cutting instrument in a manner that allows leveling of the cutting instrument to a desired position.

Suitable transmitters include mechanical and/or electronic devices capable of generating a signal, including a light signal, a radio signal, an electromagnetic signal and the like. In an embodiment, the transmitter generates a visible light signal capable of being seen by a user.

Suitable receivers include, visible indications or markers, mechanical and/or electronic devices capable of receiving a signal, in an embodiment, the signal generated by the transmitter. In an embodiment, the receiver may comprise a visible indication, mark, or aperture on the support member that allows a user to align the support member to the signal generated by the transmitter. The aperture may comprise a hole, a slot or the like.

As will be appreciated by those of ordinary skill in the art, the transmitter, and/or the receiver, may comprise a transceiver capable of both receiving and transmitting.

Suitable support members include support members that are substantially rigid. Support members may comprise metal, such as, but not limited to steel, iron, aluminum, titanium, and alloys of these metals with other metals; wood or cellulostic material, such as, but not limited to: oak; elm; ash; mahogany; particle board, pine, other hard and soft woods and the like; cardboard and/or other paper materials; polymeric materials, including plastics; and/or mixtures of all of these materials and the like. Each support member may further comprise a plurality of parallel members. The plurality of parallel members may be separated by mechanical fasteners, or spacers, such as those described herein. A support member may comprise a hole, aperature, and/or other means for facilitating attachment of a mechanical fastener.

The means for attaching the first or second support members to a structure can comprise mechanical fasteners, including tension devices, such as springs; bolts; screws; nuts; washers; elastomer; magnetic fasteners; combinations thereof (e.g. a spring loaded clip), and the like. In certain embodiments, the means for attaching may comprise adhesives and/or adhesive tapes. The mechanical fasteners may be adaptable to allow the first and/or the second support member to move with respect to the structure, for example through the use of threaded, or similarly adjustable, mechanical fasteners; or tension devices such as springs.

In a further embodiment, the present invention provides a cutting instrument comprising a level of the present invention. In an embodiment a cutting instrument comprises: a first surface for cutting; a transmitter; a first support member comprising the transmitter; a receiver; a second support member comprising the receiver; wherein the first and second support members are positionable proximate to the cutting surface. In a further embodiment, the cutting instrument comprises a surface proximate to the first surface for cutting and means for attaching the first support member and/or the second support member to the first surface for cutting.

In an embodiment, a surface for cutting comprises a surface adapted, or adaptable, for cutting turf, such as a blade, reel blade, knife or the like. In another embodiment, a surface for cutting comprises a surface adapted, or adaptable, for cutting earth, such as a blade. Suitable surfaces for cutting include those known to those of ordinary skill in the art of turf management and/or earth grading, and include, but are not limited to, the blades, reels, structures and the like typically found on turf equipment such as mowers and earth equipment such as graders.

Embodiments of the present invention may be advantageously adapted for use with turf or earth machines. In a further embodiment, the present invention comprises a turf machine comprising a cutting instrument of the present invention. Exemplary turf machines include those in widespread use and/or commercially sold, now, or in the past or future, for maintaining turf, for example turf found on golf courses or other landscaped areas. Turf machines are currently marketed and sold by companies such as John Deere, Inc., Moline, Ill.; The Toro Company, Bloomington, Minn.; and similar companies that may be found, for example, by reference to the National Golf Course Owners Association Buyers' Guide. Exemplary earth machines include, but are not limited to, those sold by Caterpillar, Inc., Peoria, Ill.; Volvo Construction, Inc., Asheville, N.C.; Hitachi America, Inc., Tarrytown, N.Y.

In another embodiment, the present invention provides an assembly for adjustment and leveling, relative to another, for any machine, piece of equipment, assembly, component, unit, attachment, object, group of objects, entity, or group of entities, comprising: a transmitter unit wherein a signal is generated and propagated in such a manner that it produces a positive feed-back condition that will be discernible to the end-user when a desired alignment condition is present; a receiver unit wherein a signal generated and propagated by the transmitter unit a condition is produced that facilitates detection of a positive feed-back condition that will be discernible to the end-user; a structure assembly providing support for a transmitter unit and an associated receiver unit wherein one, the other, or both the transmitter unit or the receiver unit has freedom of movement about a horizontal axis, each with respect to the other, such that upon realization of desired alignment condition, positive feedback will be discernible to the end-user.

In an embodiment, the structure assembly that provides support for one, the other, or both the transmitter unit or the receiver unit is an independent structure assembly providing support for other. In another embodiment, the structure assembly that provides support for one, the other, or both, the transmitter unit or the receiver unit comprises two parallel surfaces attached together, and separated by, a spacer of sufficient thickness to achieve desired clearance, when the support structure is attached to a supporting surface, to prevent contact between any adjacent surface, that is not permitted contact with the surface of one of the parallel support structures, while allowing contact of the other parallel surface of the support structure to an adjacent surface, that is permitted contact.

In another embodiment, the structure assembly that provides support for one, the other, or both, the transmitter unit or the receiver unit possesses sufficient magnetization such that the structure assembly is capable of secure attachment to a receptive surface.

Further features and advantageous of embodiments of the present invention are set forth in the following more detailed description.

BRIEF DESCRIPTION OF THE FIGURES

Various features, aspects and advantages of the present invention will become more apparent with reference to the following figures.

FIGS. 1a and 1b show side perspective views of a leveling assembly with the transmitter and receiver units mounted on individual support structures in accordance with an embodiment of the present invention.

DETAILED DESCRIPTION

Figure 2:
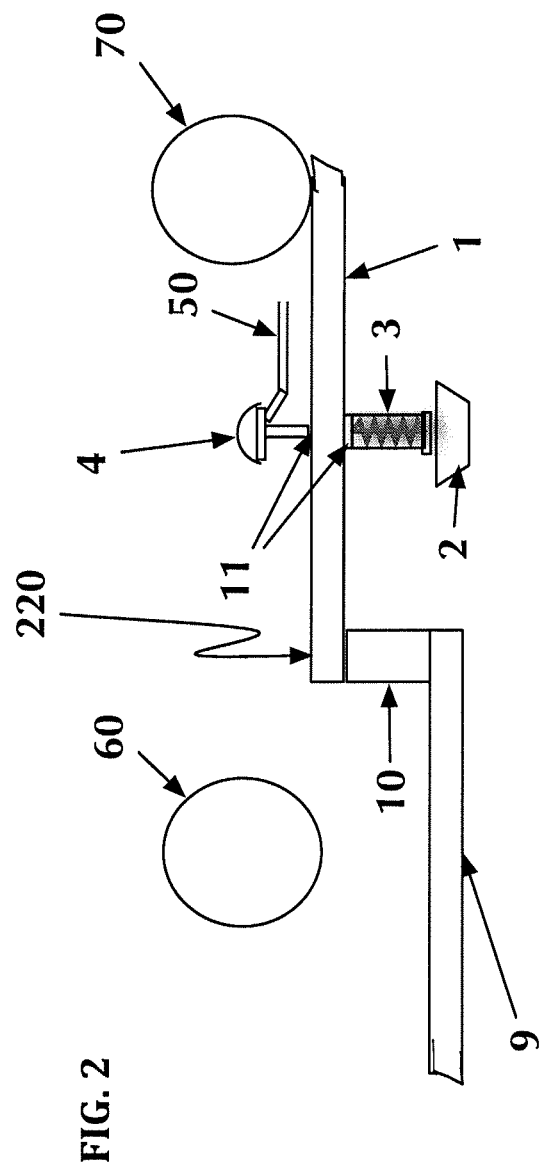
FIG. 2 shows a partial side perspective view of an individual support structure, as shown in FIG. 1, secured to a mower cutting unit bedbar/bedknife assembly in accordance with an embodiment of the present invention.

The subject matter of embodiments of the present invention is described herein with specificity to meet statutory requirements, but this description is not necessarily intended to limit the scope of future claims. The subject matter to be claimed may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

Further, as the present invention is intended for, and capable of, adaptation to provide an assembly for adjustment and leveling, relative to another, for any machine, piece of equipment, assembly, component, unit, attachment, object, group of objects, entity, or group of entities, even such as are not associated with that which requires adjustment and leveling, the following detailed descriptions and referenced illustrations should not be understood to limit the invention to the specific embodiments detailed or illustrated, but rather, as exemplifications of the spirit and scope of the invention.

Particular features described herein can function as independent units, or in any combination or manifestation of units, and with or without any other described feature. Features functioning as single units and features functioning in various combinations may address differing quantities or types of issues than those described in exemplary embodiments.

Embodiments of the present invention generally provide a level (an assembly for leveling), relative to another, for any machine, piece of equipment, assembly, component, unit, attachment, object, group of objects, entity, or group of entities, even such as are not associated with that which requires adjustment and leveling.

Certain embodiments of the present invention are advantageously adapted for use with turf equipment, such as mowers. Mower machines (e.g. mowers) are used regularly to trim grass and other vegetation in turf and landscape management operations. Typically, mower machines are comprised of one or more cutting units mounted to the mower that consist of single or multiple reels containing a series of blades that rotate adjacent to a bedbar/bedknife assembly at an angle, scissoring passing vegetation between the two units, and ideally producing an orderly cut. The reel and bedbar/bedknife are generally mounted to a frame, which also supports rollers or other similar devices that position the reel and bedbar/bedknife relative to the ground to achieve appropriate height of cut of the turf or vegetation subsequent to cutting. Height of cut is established by the distance between the ground and the cutting assembly, therefore frequent and accurate adjustment of the equipment is required to prolong equipment life and to ensure a uniform and level cut. Cutting unit adjustments occur regularly and are required during reassembly following replacement or sharpening of reel or bedbar/bedknife blades and also when mower machines are used to maintain grounds with a variety of turf or vegetation heights. Mower cutting machines that use reel unit and bedknife assemblies are typically deployed in turf and landscape management operations that require close, quality turf or vegetation cutting, such as golf courses and resorts.

Cutting unit reel height adjustment is achieved by adjusting one, or the other, or both, of the cutting unit front or rear positioning rollers associated with the reel. The positioning rollers are either fixed, and adjusted by inserting a pin into the appropriate receiver opening in the frame, or are variable, and are adjusted by manipulating a nut and bolt assembly, or a bolt and slotted slide-arm assembly. The positioning rollers are generally adjusted on each side of the roller. Proper positioning roller alignment is important to achieve quality results when cutting vegetation, for example turf, or grass, particularly, for example grass golf course greens. Improper alignment can result in uneven vegetation cutting, or cutting unit damage caused by cutting unit ground contact while cutting uneven surfaces. Such damage can necessitate costly repairs that may take weeks or months.

Current (prior to the present invention) reel height adjustment techniques require repeated measurements during manual adjustment of positioning rollers. Mower machines can have single or multiple cutting units, each requiring independent adjustment of positioning rollers. Additionally, in mower machines with multiple cutting units, positioning rollers may require subsequent adjustment, and remeasurement, if other cutting unit positioning rollers will not adjust within tolerance of the height selected for the previously adjusted cutting unit positioning rollers. Prior to the present invention techniques for measuring the adjustment of positioning rollers, contribute to increased labor costs and have a tendency to create a disincentive for making the adjustments. One response in turf and landscape management operations has been to designate mower machines to particular areas to avoid adjusting positioning rollers. This has led to increased capital and maintenance expense by increasing the number of mower machines needed to maintain an operation.

The present inventor has recognized that reducing the labor associated with achieving accurate adjustments of positioning rollers will remove existing disincentives to turf and landscape management operations to make frequent alignment adjustments to positioning rollers. The present inventor has also recognized that this will lead to higher quality turf or vegetation cuts and reduced mower cutting unit damage. The present inventor has further recognized that increasing the simplifying measurement of roller adjustment may increase the frequency of positioning roller adjustment resulting in reduced capital and maintenance costs. Turf and landscape management operations will be capable of reducing their mower machine fleet through the reduction in labor costs associated with measuring the position of roller adjustments.

In an embodiment the present invention provides a level that allows measurement of an assembly for adjusting mower machine cutting unit positioning rollers relative to their associated cutting unit reel. In an embodiment the present invention relates to mower machines that allow the leveling of positioning rollers relative to their associated cutting unit reel. A level of the present invention comprises a transmitter and receiver pair, with each respective transmit or receive unit mounted to a support structure that is capable of being positioned to a cutting instrument in a manner that facilitates positioning roller adjustment. The transmitter and receiver are mounted in relation to one another on the support structure such that desired alignment of the positioning rollers will result in a transmit and receive condition that provides positive feedback to the end-user.

As a result, the instrumentation addresses a critical need in turf and landscape management operations to significantly reduce the labor associated with measuring, adjusting and maintaining mower machine cutting units, and provides turf and landscape management personnel, during maintenance of mower machines, the capability of leveling positioning rollers relative to the associated cutting unit reel with increased efficiency and accuracy.

FIGS. 1a and 1b depict an embodiment of a level of the present invention. As shown in FIGS. 1a and 1b, a level comprises a first support structure 20 and a second support structure 200. First support structure 20, may further comprise a plurality of support members 1 and 9, separated by spacer 10. In the depicted embodiment the spacer is of sufficient thickness to allow for clearance when the support structure 20 is attached to a surface 50, as shown in FIG. 2. Support structure 20, further comprises a transmitter unit 5, with signal propagating section 6, mounted, in the depicted embodiment on support member 9.

In the depicted embodiment support member 1 further comprises a hole, or space, 11. Threaded knob 2 is inserted through spring 3, and into and through receiver hole 11, and then into an associated threaded cap 4, which then, upon rotation of threaded knob 2 in the appropriate direction relative to threaded cap 4, allows the retaining assembly to simultaneously secure threaded knob 2 and vary the compression of spring 3. This configuration enables the end-user to mount and position support structure 20 such that signal propagating section 6 can be positioned relative to receiver 108 on receiving unit 107, wherein, a signal propagated by propagating section 6 will be received by receiver 108 thereby generating a positive feedback condition discernible to the end-user.

As shown in FIG. 1b an embodiment of a level of the present invention may comprises a second support structure 200, further comprising a plurality of support members 101 and 109, separated by a spacer 110. In the depicted embodiment the spacer is of sufficient thickness to allow for clearance when the support structure 200 is attached to a surface 50, as shown in FIG. 2. Support structure 200, further comprises a receiver unit 107, with a receiver 108, mounted, in the depicted embodiment on support member 109.

In the embodiment depicted in FIG. 1b, support member 101 includes a hole, or space, 111. Threaded knob 102 is inserted through spring 103, and into and through receiver hole 111, and then into an associated threaded cap 104, which then, upon rotation of threaded knob 102 in the appropriate direction relative to threaded cap 104, allows the retaining assembly to simultaneously secure threaded knob 102 and vary the compression of spring 103. This configuration enables the end-user to mount and position support structure 200 such that signal receiver 108 can be positioned relative to signal propagating section 6 on support member 9, wherein, a signal propagated by propagating section 6 will be received by receiver 108 thereby generating a positive feedback condition discernible to the end-user.

FIG. 2 illustrates a level of FIGS. 1a and 1b positioned for use adjacent to positioning rollers 60 and 70 and cutting instrument 50, depicted as a bedbar/bedknife assembly, which are exemplary of the positioning rollers and cutting instrument that may be found, for example, on turf equipment, e.g. a mower. In the embodiment depicted, the parallel support members 1, 9 of support structure 220 allow for clearance, through spacer when the level is positioned for use, to prevent contact between the front positioning roller 60, and the adjacent parallel surface of the support structure while allowing contact of the other parallel surface of the support structure and the rear positioning roller 70. This configuration eliminates the need to raise the front positioning roller 60 during the cutting unit positioning roller adjustment process. Upon placement of threaded cap 4 adjacent to, and in contact with, mower machine cutting unit bedbar/bedknife assembly 50, and subsequent rotation of threaded knob 2 in the appropriate direction relative to threaded cap 4, retaining assembly simultaneously secures threaded knob 2 and varies the compression of spring 3 allowing the end-user to securely mount each respective support structure assembly in such a manner that transmitter unit 5 and signal propagating section 6, and receiver unit 107 and signal receiver 108 (not shown) are in a position, each relative to the other, and at as great a distance, each from the other, as is facilitated by the surface to which they are secured, in this example the length of the shaft of the positioning roller.

As set forth above, transmitter unit and signal propagating unit may comprise an optical transmission device, for example, a commercially available laser transmitter. Receiver unit and signal receiver may comprise, for example, a signal barricade structure comprised of a resilient material, receptive to machining, finished with a light-absorbing, non-reflective coating, containing a recessed indicator slot, left unfinished, or finished with a light-reflecting coating. The transmitter unit may be positioned to project a laser signal, perpendicular to the support structure assembly surface associated with transmitter unit and directed toward the receiver unit recessed indicator slot, providing visual feedback to the end-user to facilitate achievement of desired alignment of appropriate mower cutting unit reel positioning roller.

Figure 3:
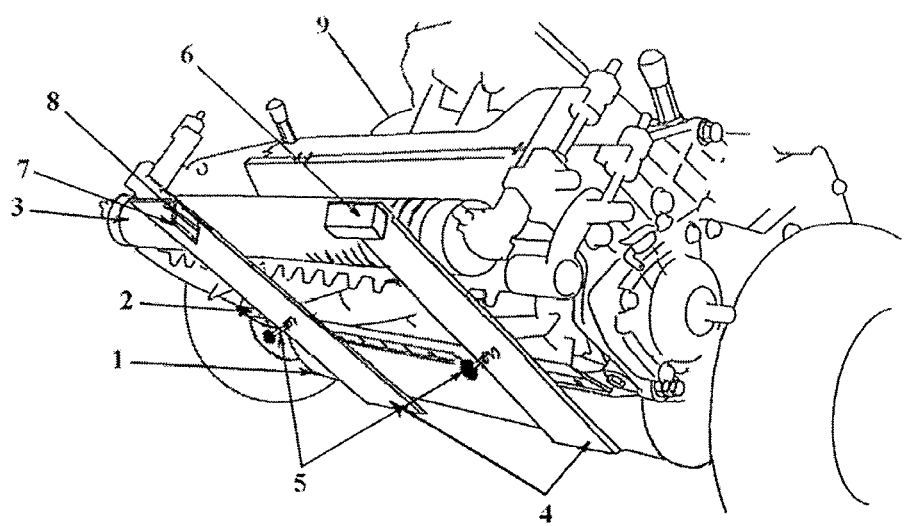
FIG. 3 shows a partial bottom perspective view of the positioning roller adjustment and leveling device shown in FIGS. 1a and 1b, secured to a mower cutting unit bedbar/bedknife assembly in accordance with an embodiment of the present invention.

FIG. 3, provides a partial bottom perspective view of the positioning roller adjustment and leveling device shown in FIG. 1, secured to a mower cutting unit bedbar/bedknife assembly. An embodiment of a level of the present invention may be secured to a mower cutting unit to facilitate use.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. An apparatus for adjusting alignment of a cutting instrument comprising:
   a cutting surface;
   a first support member;
   a transmitter in communication with the first support member, the transmitter capable of generating a signal;

a second support member; and a receiver in communication with the second support member, the receiver capable of receiving a signal;

wherein the first and second support members are positionable to allow the signal from the transmitter to be received by the receiver and positionable proximate to the cutting surface, thereby capable of being positioned to align the cutting instrument in an alignment position defined by the transmitter and the receiver.

2. The apparatus of claim 1 further comprising:

a mechanical fastener on the first support member adapted to allow the first support member to be affixed to a structure.

3. The apparatus of claim 1 further comprising:

a mechanical fastener on the second support member adapted to allow the second support member to be affixed to a structure.

4. The apparatus of claim 1 wherein the receiver is an aperture.

5. The apparatus of claim 4 wherein the signal comprises visible light.

6. A turf machine comprising the apparatus of claim 1.

\* \* \* \* \*